US006876298B2

(12) United States Patent
Litkouhi et al.

(10) Patent No.: US 6,876,298 B2
(45) Date of Patent: Apr. 5, 2005

(54) AUDIBLE WARNING FOR VEHICLE SAFETY SYSTEMS

(75) Inventors: Bakhtiar B. Litkouhi, Washington, MI (US); Varsha Sadekar, Sterling Heights, MI (US); Donald K. Grimm, Utica, MI (US); Raymond J. Kiefer, Huntington Woods, MI (US)

(73) Assignee: General Motors Corporation, Detroit, MI (US)

( * ) Notice: Subject to any disclaimer, the term of this patent is extended or adjusted under 35 U.S.C. 154(b) by 48 days.

(21) Appl. No.: 10/389,324

(22) Filed: Mar. 14, 2003

(65) Prior Publication Data

US 2004/0178893 A1 Sep. 16, 2004

(51) Int. Cl.$^7$ .................................................. B60Q 1/00
(52) U.S. Cl. ....................... 340/435; 340/436; 340/903; 180/274
(58) Field of Search ................................. 340/837, 435, 340/436, 433, 903; 348/148, 118; 180/274, 169

(56) References Cited

U.S. PATENT DOCUMENTS

| 4,528,563 | A | * | 7/1985 | Takeuchi | 340/903 |
| 5,450,057 | A | * | 9/1995 | Watanabe | 340/435 |
| 5,979,586 | A | * | 11/1999 | Farmer et al. | 340/435 |
| 6,097,285 | A | * | 8/2000 | Curtin | 340/436 |
| 6,731,204 | B2 | * | 5/2004 | Lehmann | 340/435 |

* cited by examiner

Primary Examiner—Davetta W. Goins
(74) Attorney, Agent, or Firm—Kathryn A. Marra

(57) ABSTRACT

A vehicle warning system includes a vehicle having first and second outer zones and a passenger compartment. A first active safety system monitors the first outer zone and generates first warning signals. A second active safety system monitors the second outer zone and generates second warning signals. A vehicle audio output device includes a plurality of speakers that are located in the vehicle passenger compartment. The first warning signals are output to a one or more of said speakers of the vehicle audio output device at a first frequency. The second warning signals are output one or more of said speakers of the vehicle output audio device at a second frequency.

19 Claims, 4 Drawing Sheets

AUDIBLE WARNING FOR VEHICLE SAFETY SYSTEMS

FIELD OF THE INVENTION

The present invention relates to active safety systems of vehicles, and more particularly to audible warnings that are generated by active safety systems of vehicles.

BACKGROUND OF THE INVENTION

Vehicles now include one or more active safety systems that warn the driver of danger that may require immediate attention. For example, the active safety systems may include a forward collision warning system that warns a driver of a potential collision with a moving object such as a vehicle or a pedestrian or with a non-moving object such as a building. Other active safety systems include but are not limited to adaptive cruise control, park assist, rear and side object detection, precrash detection, pedestrian detection and/or lane departure warning systems.

Each of these active safety systems typically employs one or more sensors such as radar, acoustic and/or optical sensors. For example, the park assist, collision warning and side object detection systems typically include one or more radar sensors that are pointed in forward, rearward, and/or side directions. The radar sensors generate output signals that are used to measure a distance and velocity between the vehicle and other moving and/or non-moving objects. The active safety systems may also compute the relative speeds of the vehicle and the objects and/or angles between the vehicle and the objects.

The active warning system triggers audio, visual and/or haptic alarms to alert the driver if needed. Haptic alarms provide physical feedback such as seat vibration. Usually, the audio alarm is generated using the speakers that are associated with a radio system in the vehicle to reduce cost, although other audio output devices may be used. Additionally, dedicated visual indicators and/or visual indicators that are associated with an instrument panel (IP) of the vehicle may also be used.

For example, the lane departure warning systems typically include optical sensors that detect left and right lane markers that are associated with a lane. The lane departure warning system monitors vehicle position and direction relative to the lane markers and sounds audio, visual and/or haptic alarms when the driver is too close to and/or crosses the left or right lane marker.

When more than one active safety system is implemented in the same vehicle, it becomes more difficult to notify the driver and to provide the driver with the information that can be quickly acted upon. In other words, the driver of the vehicle needs to know where to direct his or her attention when one of the active safety systems sounds an alarm.

SUMMARY OF THE INVENTION

A vehicle warning system includes a vehicle having first and second outer zones and a passenger compartment. A first active safety system monitors the first outer zone and generates first warning signals. A second active safety system monitors the second outer zone and generates second warning signals. A vehicle audio output device is located in the vehicle passenger compartment. The first warning signals are output to one or more speakers of the vehicle audio output device at a first frequency. The second warning signals are output to one or more speakers of the vehicle output audio device at a second frequency.

In other features, the first active safety system includes one of a forward collision warning system, a rear collision warning system, an adaptive cruise control system, a forward park assist system, a rear park assist system, a left side object detection system, a right side object detection system, a left lane departure warning system, and a right lane departure warning system.

In yet other features, the vehicle output audio device includes a front speaker located in a front position and a rear speaker located in a rear position. The first active safety system is associated with a front outer zone and the second active safety system is associated with a rear outer zone. The first active safety system is one of a forward collision warning system, an adaptive cruise control system, a forward park assist system, a left lane departure warning system, and a right lane departure warning system.

In other features, the second active safety system is one of a rear collision warning system, a rear park assist system, a left side object detection system, and a right side object detection system. The first active safety system identifies potential hazards in the front outer zone and outputs the first warning signals at a first frequency to the front speaker. The second active safety system identifies potential hazards in the rear outer zone and outputs the second warning signals at a second frequency to the rear speaker. The second frequency is lower than the first frequency.

In still other features, the first frequency is approximately between 1500 and 4000 Hz. The second frequency is approximately between 500 and 1000 Hz.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
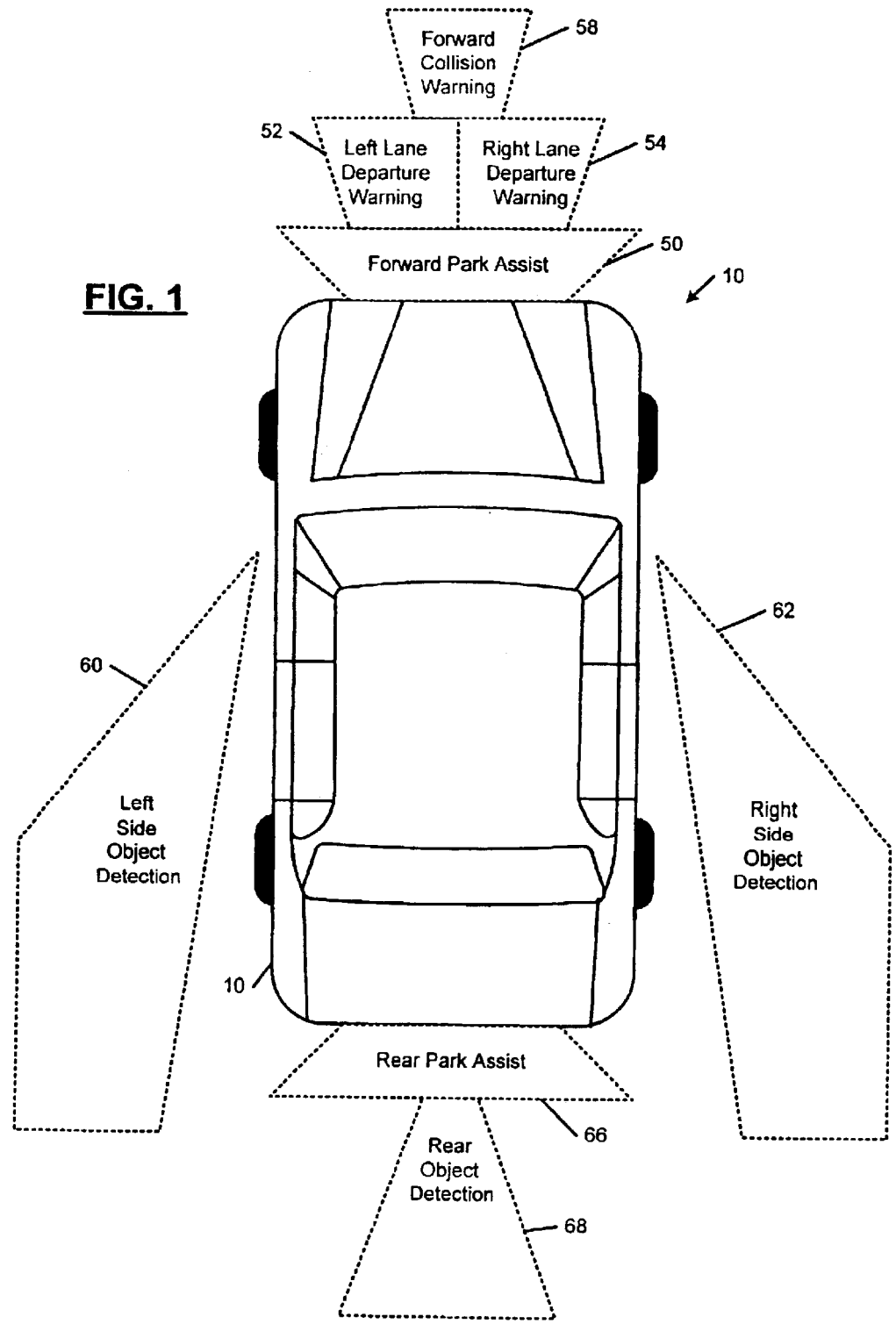
FIG. 1 illustrates a vehicle, active safety zones around the vehicle and active safety systems that monitor the active safety zones.

The following description of the preferred embodiment(s) is merely exemplary in nature and is in no way intended to limit the invention, its application, or uses. For purposes of clarity, the same reference numbers will be used in the drawings to identify similar elements.

Figure 2:
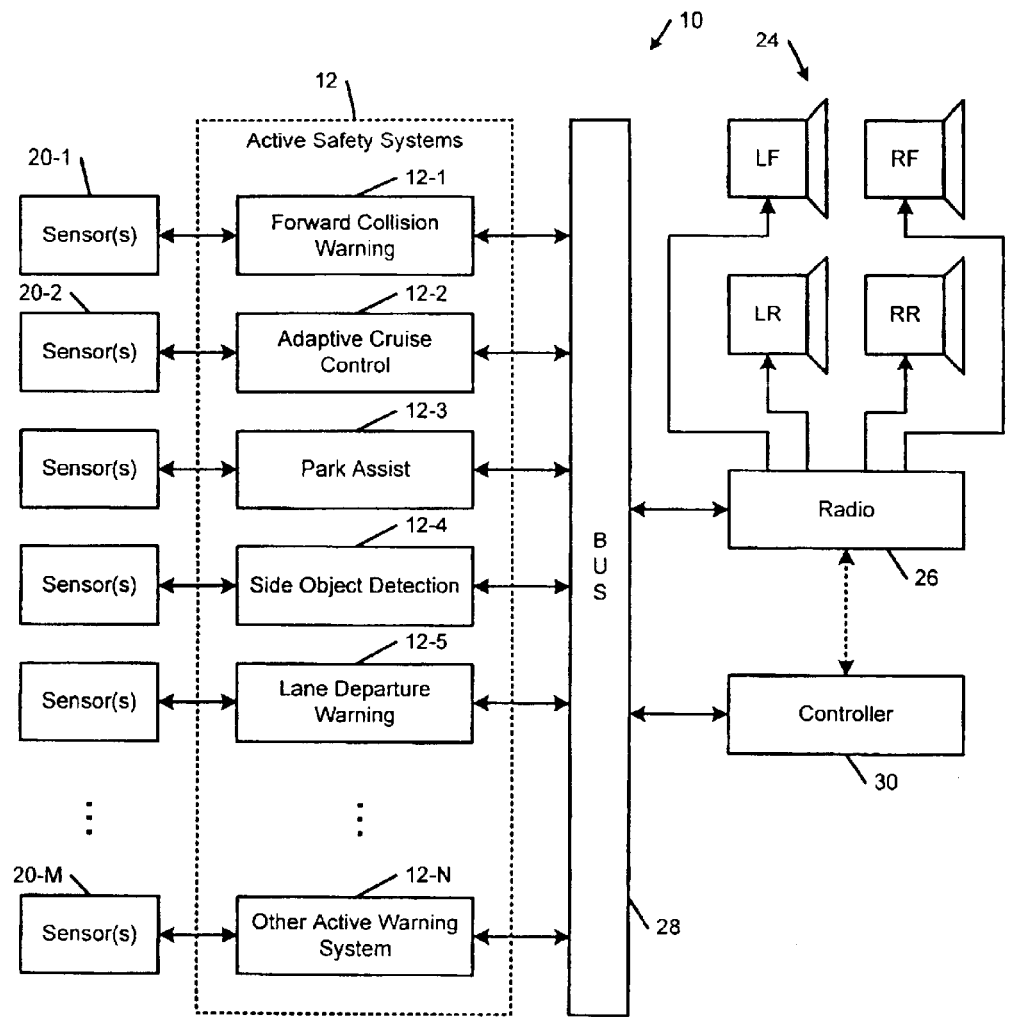
FIG. 2 is a functional block diagram of a vehicle including one or more active safety systems.

Referring now to FIGS. 1 and 2, a vehicle 10 includes two or more active safety systems 12-1, 12-2, . . . , and 12-N (collectively referred to herein as active safety systems 12). For example, the active safety system 12-1 is a forward collision warning (FCW) system. The active safety system 12-2 is an adaptive cruise control (ACC) system. The active safety system 12-3 is a park assist (CPA) system. The active safety system 12-4 is a side object detection (SOD) system. The active safety system 12-5 is a lane departure warning (LDW) system. As can be appreciated, any other active safety systems 12 in addition to and/or instead of these exemplary active safety systems may be used without departing from the present invention. Each active safety system can be implemented using dedicated and/or shared controllers with one or more software modules, one or more application specific integrated circuits (ASIC), dedicated discrete circuits, or in any other suitable manner.

The active safety systems 12 may include one or more sensors 20-1, 20-2, . . . , and 20-M (collectively referred to herein as sensors 20) that sense one or more parameters variables. For example, the sensors 20 may include radar sensors, radio frequency sensors, optical sensors, acoustic sensors, infrared sensors, or any other type of sensors. The sensors 20 may be shared between two or more active safety systems and/or dedicated sensors. The active safety systems 12 process the sensed parameters. In addition, other input signals may be provided by other vehicle systems to one or more of the active safety systems. For example, vehicle speed may be input from a vehicle speedometer. Still other signals may be provided such as steering wheel position, engine parameters, wheel slip, traction control signals, transmission control signals, global position and/or map-based signals, accelerator pedal position signals, and/or any other signals. In addition, information from the environment (such as other vehicles) can be remotely communicated to the vehicle.

The active safety systems 12 include one or more algorithms that receive the input signals, that assess potential hazards in zones outside of the vehicle, and that generate audio, visual and/or haptic alarm signals to alert drivers of the potential hazards. The alarm signals may be output directly to dedicated and/or shared audio, visual and/or haptic indicators that are associated with one or more active safety system. For example, the alarm signals can be output to front and rear speakers 24 of a vehicle radio system 26 either directly, via a data bus 28, or via the data bus and/or one or more vehicle controllers 30. In a preferred embodiment, four channels including left front 24-1, right front 24-2, left rear 24-3 and right rear 24-4 are used. As can be appreciated, additional or fewer channels and/or speakers may be used. In addition, additional dedicated speakers that are not associated with the radio may be employed.

The active safety systems 12 operate in multiple defined zones outside of the vehicle. For example, the FPA system 12-3 operates in a first front zone 50 that is located close to the front of the vehicle 10. Right and left lane departure systems 12-5 operate in second and third zones 52 and 54 that are located in the front of the vehicle outside of the first front zone 50. Forward collision warning (FCW) 12-1 operates in a fourth zone 58 that is located in front of the vehicle and includes all or part of the second and/or third zones 52 and 54.

Left and right side object detection systems 12-4 operate in left and right side zones 60 and 62. Rear park assist 12-3 operates in a fifth zone 66 at the rear of the vehicle. Rear object detection operates in a sixth zone 68 that is at the rear of the vehicle outside of the fifth zone 66.

The effectiveness of the warning signal for the active safety system is significantly improved when the active warning system directs the attention of the driver to the anticipated direction of the potential hazard. The warning signals are transmitted to the speakers in the vehicle. To provide direction information to the driver, the active safety systems output the warning signal to speakers and/or channels that correspond to the direction of the potential hazard. The speakers and/or channels can be used individually or in combination. If multiple speakers are associated with one channel, one, some or all of the speakers can be used.

Figure 3:
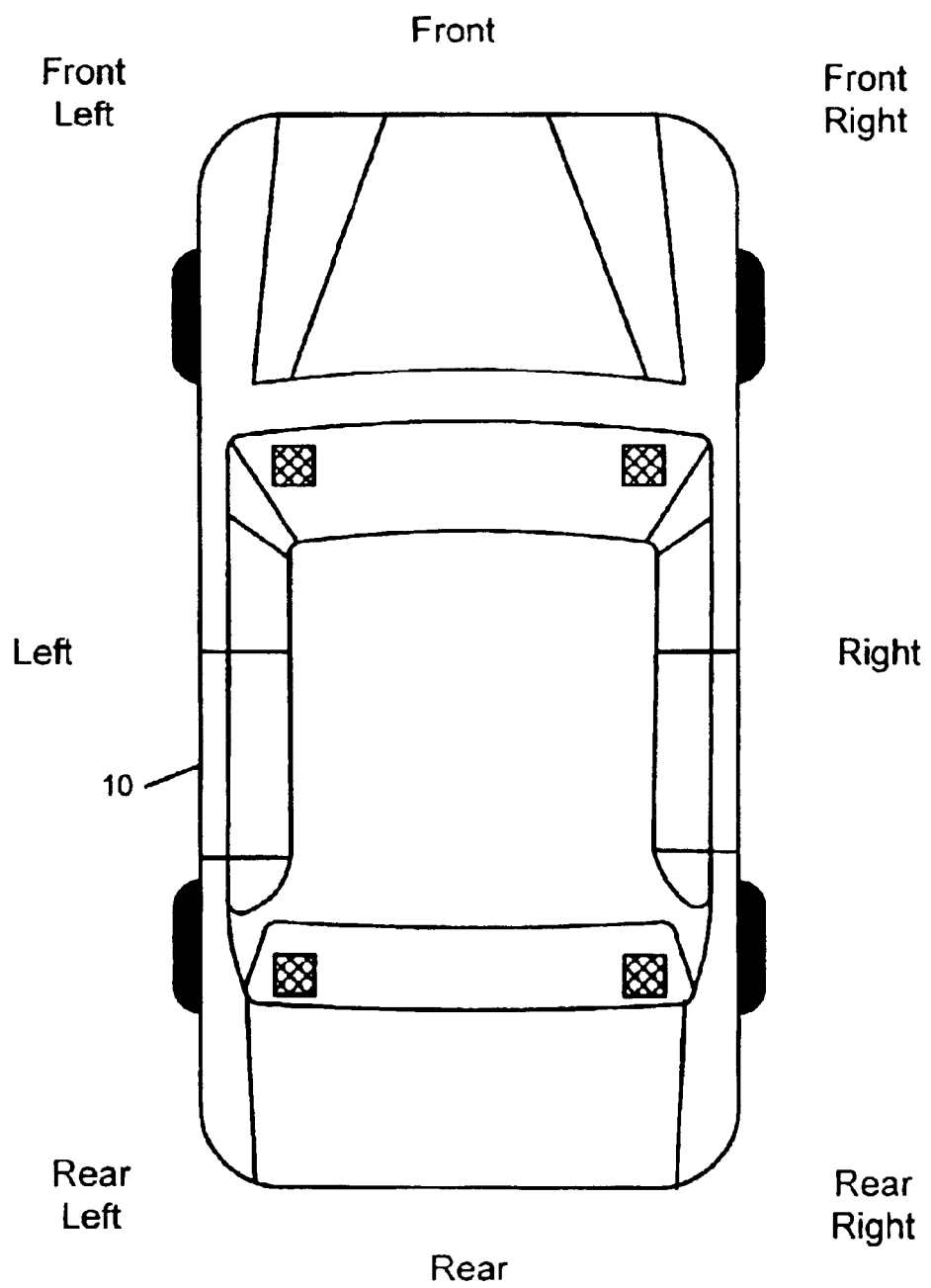
FIG. 3 illustrates exemplary speaker locations and possible vehicle safety zone alert directions.

Referring now to FIG. 3, when a threat in front of the vehicle occurs, audio signals are output to the front left and front right speakers and/or channels simultaneously to indicate a potential hazard in the front. When a threat occurs on the left side, audio signals are output to the front left and rear left speakers and/or channels simultaneously. When a threat in the front left occurs, audio signals are output to the front left speaker and/or channel only.

In addition to generating the audio signals with the corresponding speakers or channels, the present invention further employs audio signals having different frequencies to improve the driver's directional perception. In other words, two or more frequencies are assigned to the multiple zones.

Figure 4:
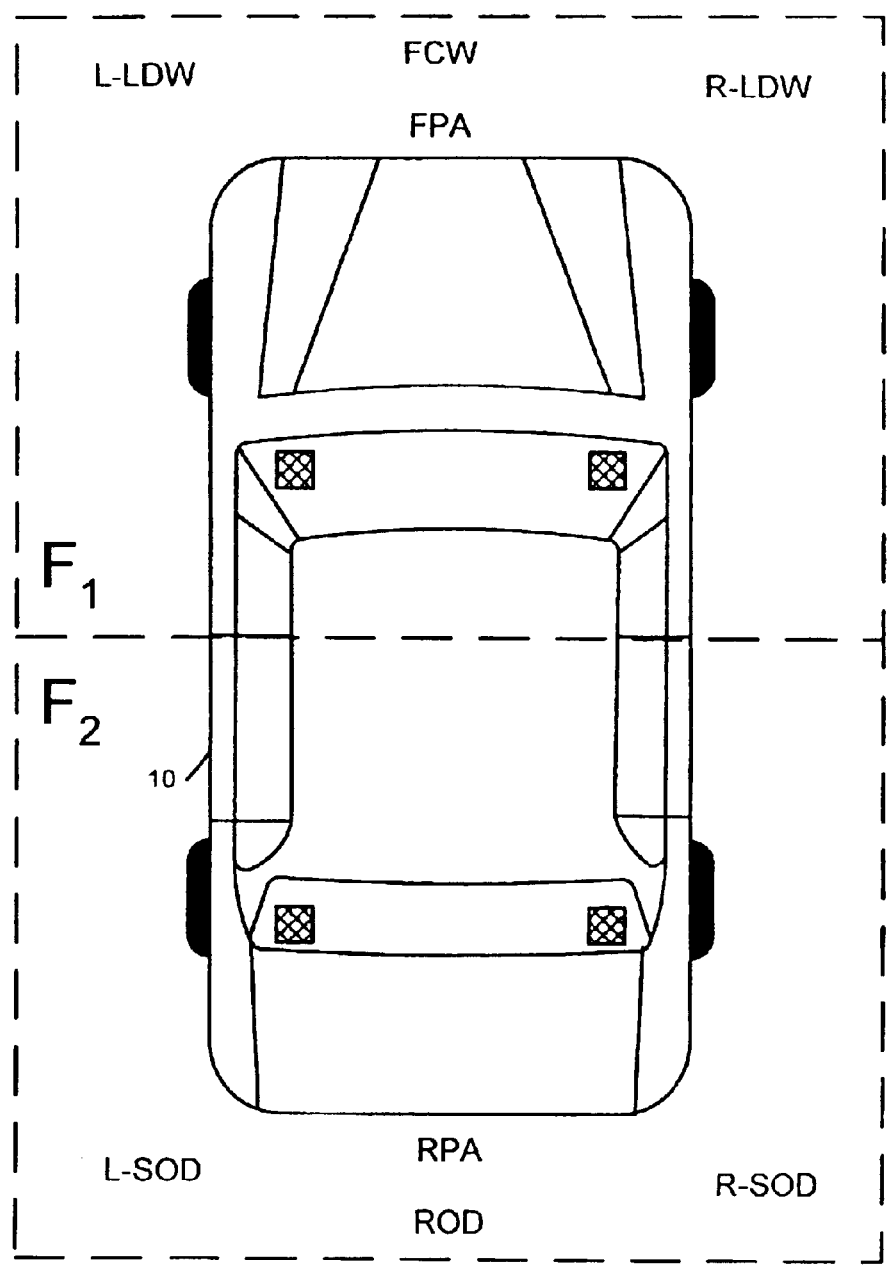
FIG. 4 illustrates one exemplary frequency-location combination.

Referring now to FIG. 4, forward potential hazards that are associated with the active safety systems directed in front zones are indicated using audio signals having a first frequency. Rearward potential hazards associated with the active safety systems directed in rear zones are indicated using audio signals having a second frequency. While forward/rear differentiation is shown in FIG. 4, the present invention contemplates assigning the frequencies based on other criteria.

In a preferred embodiment, higher frequencies are used for warnings from active safety systems in which the direction of the potential threat is forward of the driver. Lower frequencies are used for warnings from active safety systems in which the direction of the potential threat is rearward of the driver. For example, the higher frequency can be approximately 1500–4000 Hz. The sound is preferably a beeping sound. The lower frequency sound can be approximately 500–1000 Hz. As can be appreciated, the frequencies and/or sounds can be varied depending upon the particular application.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle warning system, comprising:
    a vehicle having first and second outer zones and a passenger compartment, wherein a first frequency is associated with said first outer zone and a second frequency is associated with said second outer zone and wherein said first frequency is not equal to said second frequency;
    a first active safety system that monitors said first outer zone and that generates first warning signals;
    a second active safety system that monitors said second outer zone and that generates second warning signals; and
    a vehicle audio output device including a plurality of speakers that are located in said vehicle passenger compartment,
    wherein said first warning signals are output to one or more speakers of said vehicle audio output device at said first frequency and wherein said second warning signals are output to one or more speakers of said vehicle output audio device at said second frequency.

2. The vehicle warning system of claim 1 wherein said first active safety system includes one of a forward collision warning system, a rear collision warning system, an adaptive cruise control system, a forward park assist system, a rear park assist system, a left side object detection system, a right side object detection system, a left lane departure warning system, and a right lane departure warning system.

3. The vehicle warning system of claim 1 wherein said second active safety system includes one of a forward collision warning system, a rear collision warning system, an adaptive cruise control system, a forward park assist system, a rear park assist system, a left side object detection system, a right side object detection system, a left lane departure warning system, and a right lane departure warning system.

4. The vehicle warning system of claim 1 wherein said vehicle output audio device includes a front speaker located in a front position and a rear speaker located in a rear position.

5. The vehicle warning system of claim 4 wherein said first active safety system is associated with a front outer zone and said second active safety system is associated with a rear outer zone.

6. The vehicle warning system of claim 5 wherein said first active safety system is one of a forward collision warning system, an adaptive cruise control system, a forward park assist system, a left lane departure warning system, and a right lane departure warning system.

7. The vehicle warning system of claim 5 wherein said second active safety system is one of a rear collision warning system, a rear park assist system, a left side object detection system, and a right side object detection system.

8. The vehicle warning system of claim 5 wherein said first active safety system identifies potential hazards in said front outer zone and outputs said first warning signals at said first frequency to said front speaker, wherein said second active safety system identifies potential hazards in said rear outer zone and outputs said second warning signals at said second frequency to said rear speaker, and wherein said second frequency is lower than said first frequency.

9. The vehicle warning system of claim 8 wherein said first frequency is approximately between 1500 and 4000 Hz.

10. The vehicle warning system of claim 8 wherein said second frequency is approximately between 500 and 1000 Hz.

11. A method of operating a vehicle warning system for a vehicle having first and second outer zones and a passenger compartment, comprising:
monitoring said first outer zone using a first active safety system, wherein a first frequency is associated with said first outer zone;
generating first warning signals using said first active safety system based on potential threats in said first outer zone;
monitoring said second outer zone using a second active safety system, wherein a second frequency is associated with said second outer zone;
generating second warning signals using said second active safety system based on potential threats in said second outer zone; and
outputting at least one of said first and second warning signals using a vehicle audio output device located in said vehicle passenger compartment, wherein said first warning signals are output to said vehicle audio output device at said first frequency, wherein said second warning signals are output to said vehicle output audio device at said second frequency, and wherein said first frequency is not equal to said second frequency.

12. The method of claim 11 wherein said first active safety system includes one of a forward collision warning system, a rear collision warning system, an adaptive cruise control system, a forward park assist system, a rear park assist system, a left side object detection system, a right side object detection system, a left lane departure warning system, and a right lane departure warning system.

13. The method of claim 11 wherein said vehicle output audio device includes a front speaker located in a front position and a rear speaker located in a rear position.

14. The method of claim 13 wherein said first active safety system is associated with a front outer zone and said second active safety system is associated with a rear outer zone.

15. The method of claim 14 wherein said first active safety system is one of a forward collision warning system, an adaptive cruise control system, a forward park assist system, a left lane departure warning system, and a right lane departure warning system.

16. The method of claim 14 wherein said second active safety system is one of a rear collision warning system, a rear park assist system, a left side object detection system, and a right side object detection system.

17. The method of claim 14 further comprising:
identifying potential hazards in said front outer zone using said first active safety system;
outputting said first warning signals at said first frequency to said front speaker;
identifying potential hazards in said rear outer zone using said second active safety system; and
outputting said second warning signals at said second frequency to said rear speaker, wherein said first frequency is higher than said second frequency.

18. The method of claim 17 wherein said first frequency is approximately between 1500 and 4000 Hz and wherein said low frequency is approximately between 500 and 1000 Hz.

19. A vehicle warning system, comprising:
a vehicle having front and rear outer zones and a passenger compartment, wherein a first frequency is associated with said front outer zone and a second frequency is associated with said rear outer zone;
a first active safety system that monitors said front outer zone and that generates first warning signals;
a second active safety system that monitors said rear outer zone and that generates second warning signals; and
a vehicle audio output device located in said vehicle passenger compartment and including at least one front speaker and at least one rear speaker,
wherein said first warning signals are output to said at least one front speaker at said first frequency, said second warning signals are output to said rear speaker at said second frequency, and said second frequency is lower than said first frequency.

* * * * *